United States Patent
Seto et al.

(10) Patent No.: US 11,037,172 B2
(45) Date of Patent: Jun. 15, 2021

(54) METHOD AND SYSTEM FOR MARKING AN ITEM, AN ITEM SO MARKED AND A METHOD AND SYSTEM FOR AUTHENTICATING A MARKED ITEM

(71) Applicant: SICPA HOLDING SA, Prilly (CH)

(72) Inventors: Myron Seto, Singapore (SG); Kok Weng Mak, Puchong (MY); Rene Henri Monnard, Epalinges (CH)

(73) Assignee: SICPA HOLDING SA, Prilly (CH)

( * ) Notice: Subject to any disclaimer, the term of this patent is extended or adjusted under 35 U.S.C. 154(b) by 969 days.

(21) Appl. No.: 14/653,972

(22) PCT Filed: Dec. 20, 2013

(86) PCT No.: PCT/EP2013/077692
§ 371 (c)(1),
(2) Date: Jun. 19, 2015

(87) PCT Pub. No.: WO2014/096362
PCT Pub. Date: Jun. 26, 2014

(65) Prior Publication Data
US 2016/0110724 A1 Apr. 21, 2016

(30) Foreign Application Priority Data
Dec. 21, 2012 (EP) .................................... 12199158

(51) Int. Cl.
*G06Q 30/00* (2012.01)
*G06F 16/22* (2019.01)
(Continued)

(52) U.S. Cl.
CPC ....... *G06Q 30/0185* (2013.01); *B42D 25/405* (2014.10); *G06F 16/22* (2019.01);
(Continued)

(58) Field of Classification Search
CPC ............. G06Q 30/0185; G06Q 30/018; G06Q 10/087; G06Q 10/30; G06Q 10/10;
(Continued)

(56) References Cited

U.S. PATENT DOCUMENTS 5,289,547 A * 2/1994 Ligas .................... B41M 3/144
283/72
6,212,504 B1 * 4/2001 Hayosh ................ G06Q 20/042
235/375
(Continued)

FOREIGN PATENT DOCUMENTS

| EP | 1348199 B1 * | 4/2005 | ............. B65B 61/26 |
| WO | WO-0188846 A1 * | 11/2001 | ............. G07D 7/121 |
| WO | 2006/038114 | 4/2006 | |

OTHER PUBLICATIONS

Kevany, Sophie, "Prooftag: fraud-proof seal to combat fake wine," Decanter [online], Sep. 14, 2007, available at: < https://www.decanter.com/wine-news/prooftag-fraud-proof-seal-to-combat-fake-wine-87817/ > (Year: 2007).*
(Continued)

*Primary Examiner* — Richard W. Crandall
(74) *Attorney, Agent, or Firm* — Muncy, Geissler, Olds & Lowe, P.C.

(57) ABSTRACT

A method of marking and authenticating a manufactured item, comprising providing the manufactured item with a visible anti-counterfeiting indicium, marking with marking means the manufactured item with a visible alphanumeric string, marking with marking means the manufactured item with visible marking time data, and transmitting with data transmission and control means marking time data marked on the manufactured item and the alphanumeric string marked on the manufactured item. The method further comprises with computer database control means, receiving the transmitted marking time data and the transmitted alpha-
(Continued)

numeric string and storing in association in a database marking time information corresponding with the received marking time data marked on the manufactured item and alphanumeric information corresponding with the received alphanumeric string marked on the manufactured item. The method further comprises checking authenticity of the anti-counterfeiting indicium provided on the manufactured item, interrogating the database with the alphanumeric string read from the manufactured item to obtain marking time information for the manufactured item, and comparing the marking time information with marking time data read from the manufactured item to determine if they match. The method comprises determining the manufactured item as authentic if criteria are met, the criteria including that the checking step reveals an authentic anti-counterfeiting indicium and the comparing step determines a match.

22 Claims, 4 Drawing Sheets

(51) Int. Cl.
*G06F 16/28* (2019.01)
*B42D 25/405* (2014.01)
*G06K 9/18* (2006.01)

(52) U.S. Cl.
CPC .............. *G06F 16/285* (2019.01); *G06K 9/18* (2013.01); *G06Q 30/018* (2013.01)

(58) Field of Classification Search
CPC ........... G06Q 2220/00; G06Q 2230/00; G06Q 30/0603; G06Q 20/3829; G06Q 20/4016; G06Q 20/3276; G07F 17/3241; G06T 3/40
USPC ........................................................ 705/318
See application file for complete search history.

(56) References Cited

U.S. PATENT DOCUMENTS

| | | | | |
|---|---|---|---|---|
| 6,536,672 | B1* | 3/2003 | Outwater | G09F 3/0294 235/468 |
| 6,553,786 | B1* | 4/2003 | Kwiat | A44C 15/0015 63/26 |
| 6,600,823 | B1* | 7/2003 | Hayosh | G06Q 20/042 380/51 |
| 6,611,598 | B1* | 8/2003 | Hayosh | G06Q 20/042 380/54 |
| 7,162,035 | B1* | 1/2007 | Durst | G06K 19/086 380/54 |
| 2003/0141375 | A1* | 7/2003 | Lawandy | G06K 7/12 235/494 |
| 2004/0211844 | A1* | 10/2004 | Marshall | G06K 1/121 235/494 |
| 2005/0108044 | A1* | 5/2005 | Koster | G06F 19/3462 705/2 |
| 2005/0273434 | A1* | 12/2005 | Lubow | G06Q 10/087 705/59 |
| 2007/0110271 | A1* | 5/2007 | Beretta | B42D 25/00 382/100 |
| 2007/0210164 | A1* | 9/2007 | Conlon | G06Q 10/08 235/462.01 |
| 2008/0234853 | A1* | 9/2008 | Antonuk | B65B 61/26 700/115 |
| 2010/0214373 | A1* | 8/2010 | Carr | B41M 3/142 347/73 |
| 2011/0093109 | A1* | 4/2011 | Scheid Budzinski | G06K 9/64 700/109 |
| 2012/0234908 | A1* | 9/2012 | Wang | H04L 9/3268 235/375 |

OTHER PUBLICATIONS

Hardigee, Matt, "How to Read A Car's VIN," Jalopnik, [online], Mar. 19, 2010, available at: < https://jalopnik.com/how-to-read-a-cars-vin-5165656 > (Year: 2010).*
"Notice from the European Patent Office dated Oct. 1, 2007 concerning business methods", Official Journal EPO, Nov. 1, 2007, pp. 592-593.

* cited by examiner

METHOD AND SYSTEM FOR MARKING AN ITEM, AN ITEM SO MARKED AND A METHOD AND SYSTEM FOR AUTHENTICATING A MARKED ITEM

FIELD OF THE INVENTION

The present invention is concerned with marking a manufactured item with a combination of authentication features, so as to allow the manufactured item to be verified as genuine. The manufactured item may particularly be an item subject to excise duties, such as tobacco products. The marking may be provided on a packet of tobacco products, such as cigarettes.

BACKGROUND TO THE INVENTION

The supply of counterfeit goods in a particular market causes a loss of revenue to manufacturers of the corresponding genuine goods, as well as to governments when those goods are subject to taxation. End users are adversely affected by counterfeit goods because they are supplied with products of inferior quality, which may even be dangerous to the health of the end user for certain products, such as when medicines are the subject of counterfeiting. The manufacturer of high quality genuine products will consequently suffer a loss to its goodwill.

A number of anti-counterfeiting measures have been proposed in the prior art with respect to packaging of cigarettes. It is known to make use of sophisticated printing techniques to make the design on the package as hard to replicate as possible.

It is also known to make use of fluorescing items that look one way under ambient light and look a different way under ultraviolet lighting. Also used are holographic images of varying degrees of complexity. Other known techniques include watermark technology, engraved gravure lines and marks that change color depending on heat applied to the mark.

There is evidence, however, that counterfeiters can make convincing copies of packaging having sets of anti-counterfeiting measures as described above.

A proposal has been made in WO 2006/038114 A1 to address this counterfeiting issue by providing a method of authenticating manufactured items, specifically packets of cigarettes. The method includes providing a plurality of secret codes to a data management centre and to a production line for the manufactured items. An ID code for each manufactured item is generated and the ID code is digitally signed by means of a secret derived from the plurality of secret codes and known to the data management centre. The method includes marking each manufactured item with the signed ID code. The manufactured item may be authenticated on request by validating the secret at the data management centre. The method proposed in this document requires each alphanumeric code sent by the user to be de-obfuscated by the data management centre and for a noise signal to be generated from the secret retrieved from a database at the data management centre before an authentication process can be finalized.

Although the above background is given mainly in the context of cigarette packets, anti-counterfeiting measures are required for packaging in many other types of products, particularly alcoholic drinks, medicinal products, perfumes and excisable products generally.

One objective of the present invention is to provide markings for a manufactured item that offer anti-counterfeiting features, which are verifiable by a user (such as an inspector of the manufactured item) in a way that does not necessarily require sophisticated technology for reading the anti-counterfeiting means.

SUMMARY OF THE INVENTION

In one aspect, the present invention provides a method of marking a manufactured item, comprising:
  providing the manufactured item with a visible anti-counterfeiting indicium by way of indicium application means;
  marking the manufactured item with a visible alphanumeric string with marking means;
  marking the manufactured item with visible marking time data with marking means;
  with transmission and control means, transmitting data representative of the alphanumeric string and marking time data marked on the manufactured item;
  with database control means and a database, receiving the transmitted data and storing in association in a database the marking time information and the alphanumeric information so that the database can be interrogated to check that the alphanumeric string and the marking time data marked on the manufactured item matches with the corresponding information stored in the database to thereby authenticate the manufactured item.

The present invention provides a method of marking a manufactured item with multi-layer anti-counterfeiting measures. A first layer is provided by the anti-counterfeiting indicium, which can be checked by an end user to authenticate the item. A second layer is provided by marking the product with the marking time data and the alphanumeric string, which allow the database to be looked up to determine if these data elements match the official information for the manufactured item as stored in the database. Even if a counterfeiter was able to generate alphanumeric strings seeming to belong to the manufactured item, the forged data can quickly and simply be ascertained as it would not, in all probability, match the marking time data stored in the database for that alphanumeric string. The database and markings of the method offers a processing-lite solution to anti-counterfeiting that allows an anti-counterfeiting determination to be made quickly and simply. No special equipment is needed to check the markings and indicium, since they are all visible by the naked eye and the alphanumeric string and marking time data can be sent to a database using basic telecommunications means.

WO 2006/038114 A1 requires sharing of secrets between production lines and a data management centre for checking the authenticity of an item. This system can be compromised by the secrets becoming known or copying of genuine IDs marked on an item. By contrast, the present invention provides interrelated data marked on the manufactured item, with one data piece being able to verify the other. In this way, mere copying of the alphanumeric string would not be sufficient to compromise the present system. Further, the present system does not necessitate such secret sharing. Instead, a combination of markings is able to provide true anti-counterfeiting measures on the manufactured item itself, in a way that is less complex and less susceptible to subversion than the prior art.

The information stored in association in the database provides, in database terminology, related attributes (the attributes of production time information and alphanumeric information being related). Thus, when manufactured items are marked in this way, the production time information and the alphanumeric information is stored in rows, each row representing the alphanumeric string and the marking time data marked on one manufactured item or a plurality of manufactured items.

The matching requirement, particularly for the marking time data marked on the manufactured item and the marking time information, should be understood as allowing for the possibility for the information in the database to be stored more generally than the specific data marked on the manufactured item, yet still be considered matching. This can be appreciated from the below discussion whereby a range of alphanumeric strings and/or a range of marking time data are stored in the database and the specific markings on the manufactured item falling within this/these ranges is considered to be matching in the present invention. For example, items could be marked with marking time data specific to the day and the hour, whereas the corresponding information stored in the database may be less specific so as to define the day, but not the hour. Nonetheless, marking time data would still be considered to match the stored data, provided the days correspond. A strict, digit for digit, match embodiment is, however, also envisaged.

The manufactured item may be a packet of cigarettes, an alcoholic beverage, a package of medicine or other such manufactured item subject to counterfeiting.

The anti-counterfeiting indicium may include a graphic having anti-counterfeiting techniques applied thereto.

The anti-counterfeiting indicium may be a thermochromic element, a luminescent element, an optically variable element that has a shifting attribute, e.g. graphic, depending on the viewing angle, or combinations of these indicia. A suitable anti-counterfeiting indicium has a hidden attribute (allowing authentication when revealed) and must be examined in a particular way by a user to reveal the hidden attribute.

More than one anti-counterfeiting indicium is preferably provided. Each indicium is preferably selected from the above list of anti-counterfeiting indicium types.

In a preferred embodiment, the anti-counterfeiting indicium is an indicium that shifts in color or some other attribute as a viewing angle changes. The indicium preferably comprises a pattern. Thus, a first color (or other attribute) is seen from a first angle and a second color (or the other attribute) is seen from a second, different viewing angle. When the indicium is viewed from a perpendicular position (relative to the surface upon which the indicium is applied), the viewing angle is required to change by at least 10° before the color or other attribute shifts. In an exemplary embodiment, a color of at least part of the indicium changes from red to green. In another exemplary embodiment, a shape of part of the indicium shifts. In a yet further preferred form, both a shape and a color attribute of the indicium shifts with viewing angle change.

The alphanumeric string is visible and the digits of the code can be ascertained by the naked eye. However, the string itself is meaningless to a human reader. It is a seemingly random string of alphanumeric digits to the human viewer. The alphanumeric string is preferably at least 4 digits long and may be up to 18 digits long. A shorter string length of between 4 and 8 digits is preferred for reasons described further below.

The marking time data should specify a date including day and year. The marking time data may further specify a time of day. For example the marking time data may specify an hour of the day and may even specify a minute of the day that the item was marked. The marking time data may include a minute field, an hour field, a day field, a month field, a year field and combinations thereof in order to specify the date (day), and preferably also the time of day, of manufacture of the item.

Thus, preferred field combinations are year and day of manufacture and preferably also hour of manufacture. Generally, manufactured items are already marked with marking time data, so special marking steps and means are not required to implement this feature of the invention.

One or more of the marking steps (e.g. both the steps of marking the alphanumeric string on the manufactured item and marking the production time data on the manufactured item) may be performed through one or more printers. For example, electrophotographic (e.g. laser) or inkjet printing could be used. Instead of using toner or ink printing methods, the item could be marked by laser engraving. The marking steps may alternatively comprise that at least one of the alphanumeric string and the production time data can be marked (e.g. printed or laser engraved) on a label or a tag to be affixed to the manufactured item.

The visible indicium may be provided by applying a pre-produced visible indicium (e.g. by attaching the pre-produced visible indicium to the manufactured item or by applying the pre-produced visible indicium to a label to be affixed to the manufactured item) or it may be provided by printing at least part thereof on the manufactured item or on a label to be affixed on the manufactured item. If at least partly printed, the visible indicium may be printed with a separate printer to that used for the markings. For example, the visible indicium may include one or more of printing at least one color (i.e. other than just black and white), printing a graphic, printing a high resolution graphic (at least 300 dpi), and printing with multiple colors. Further, a subsequent step of applying at least one anti-counterfeiting substrate to the printed image may be required for producing an anti-counterfeiting effect. For example, the substrate could be an optically variable device for causing the printed subject to change in at least one attribute depending upon viewing angle. To produce such an anti-counterfeiting visible indicium, a more sophisticated device will likely be needed than the at least one marker for marking the production time data and the alphanumeric string on the manufactured item. An indicium with an attribute that shifts depending upon viewing angle may also be provided by specialized inks that show optically varying attributes depending upon viewing angle. For example, the ink could comprise magnetic flakes that are oriented on aggregate using a magnetic field to create an optical effect that changes depending upon the viewing angle.

In an embodiment, the marking time data and the alphanumeric string are transmitted over a telecommunications network to a remote database kept at a data management centre. In particular, marking machines for carrying out the steps of marking the item with the marking time data and the alphanumeric string may be located upstream in the process line from data transmission means for transmitting the marking time data and alphanumeric string data. More specifically, the process line may comprise a data reader for reading the marking time data and the alphanumeric string on each manufactured item in the process line and the data reader may be associated with the transmission and control means to transmit the data read from the manufactured items to the data management centre at which the database will carry out the storing steps. The transmission and control means may be associated with each given data reader. A data reader may be associated with each production line and the data read may be sent to a central site data management means for transmitting to the remote data management centre over a telecommunications network. Alternatively, the transmission and control means may be in charge of transmitting the data from a plurality of data readers.

In an alternative embodiment, the marking means may be in communication with the data transmission and control means and data representative of the alphanumeric string and marking time data may be communicated to the data transmission and control means for transmission to the database control means. The data transmission and control means may be integrated with any given marking means or it may be associated with a plurality of marking means, perhaps with each marking means associated with respective process lines of manufactured items.

The use of such a data reader means provides an additional check to ensure that the marked data is readable and that the data stored in the database is representative of actual marked items.

The marking time information and/or the alphanumeric information could be stored in the form of ranges. This offers a way of significantly reducing data storage requirements. In one preferred embodiment, the marking time information is stored as a range of time, wherein a given range of time is repeated in the database for a range or set of alphanumeric strings marked on items marked with marking time data falling within that marking time range, so that an alphanumeric string read from a manufactured item can be used to interrogate the database to retrieve a range of marking time for the manufactured item and marking time data read from the manufactured item can be compared with the marking time range to determine the manufactured item as authentic if the marking time data read from the item falls within the marking time range retrieved from the database.

In one embodiment, the marking time information and/or the alphanumeric information is stored in the form of a range, wherein the alphanumeric range information corresponds to a plurality of different alphanumeric strings marked on respective manufactured items and the marking time range information corresponds to different marking time data marked on respective manufactured items. The plurality of different alphanumeric strings may be marked on manufactured items consecutively and the different marking time data may be marked on manufactured items in a time progressing way.

In one embodiment, the marking step comprises marking each consecutive item with a different, unique, alphanumeric string. In another embodiment, the marking step may comprise marking each consecutive item with a different, unique alphanumeric string for a period of time and associating in the database alphanumeric information representing the alphanumeric strings, perhaps as a range representing the full range of different alphanumeric strings for that period of time, in association with marking time information stored as a range representing the period of time. In this embodiment, the marking time data marked on all of the products could be the same for the first period of time. Alternatively, the marking time data may progress during the first period of time, but be stored as one range in the database. The alphanumeric strings could thus be run on a loop so that they are re-used for a second period of time, but being stored in the database in association with the second period of time information different from the first period of time information. As such, the combination of the range of alphanumeric strings and the marking time information would uniquely identify in the database the batch of items produced in the first period of time and the batch of items produced in the second period of time. Such a marking process would allow the string length of the alphanumeric strings to be kept short, for ease of entering the data by an end user.

It is envisaged that sets of items could be marked with the same alphanumeric string and the same production time data. Provided the number of items in the set is not overly large (e.g. the number of items in the set represents an insignificant fraction as compared to the number of items marked in a year), the anti-counterfeiting measure of the present invention of the combination of marking time data and the alphanumeric string, and their association in the database, will still be valid. Again, this will allow the alphanumeric string length to be kept relatively small. However, it is preferred that each manufactured item is marked with a unique combination of marking time data and alphanumeric string (e.g. for a given brand of manufactured item, or for a particular marking facility), even if the alphanumeric string or the marking time data is repeated for a plurality of manufactured items. The combination of alphanumeric information and marking time information stored in the database corresponding to alphanumeric strings and marking time data marked on batches of items may form a compound key for the database, since neither of these data fields are, alone, able to uniquely identify a given row of related attributes.

In one implementation, the method comprises marking a first plurality of manufactured items with respective ones of a first set of alphanumeric strings and with progressing marking time data over a first range of time and marking a second plurality of manufactured items with respective ones of a second set of alphanumeric strings and with progressing marking time data over a second range of time later than the first range of time, the method comprising storing in the database alphanumeric information corresponding to the first set of alphanumeric strings marked on the first plurality of manufactured items in association with marking time information in the form of a range of time corresponding to the first range of time and storing in the database alphanumeric information corresponding to the second set of alphanumeric strings marked on the second plurality of manufactured items in association with marking time information in the form of a range of time corresponding to the second range of time. In this way, a manufactured item can be authenticated by looking up the database using an alphanumeric string read from the item to retrieve a range of marking time for that item and checking that marking time data read from the item falls within the range of marking time read from the database. If so, the item can be confirmed as authentic. The database may store each of the first set of alphanumeric codes in association with the same range of time data for the first range of time and each of the second set of alphanumeric codes may be stored in association with the same range of time data for the second range of time.

The database can be conceptualized as associating sets of alphanumeric codes, each comprising a plurality of alphanumeric codes, in respective range of time buckets. This allows processing speed to be increased, data storage requirements to be reduced, without sacrificing, to any relevant degree, the authentication capabilities of the database.

In an embodiment, both the alphanumeric information and the marking time information are provided in the form of ranges. In one implementation, the method comprises marking a first plurality of manufactured items with respective ones of a first set of alphanumeric strings and progressing marking time data over a first period of time and marking a second plurality of manufactured items with respective ones of a second set of alphanumeric strings and progressing marking time data over a second period of time later than the first period of time, and storing first grouped associated data in the database, a first group including alphanumeric information provided in the form of a range representing the first set of alphanumeric strings and including marking time data in the form of a range of time representing the first period of time, and storing second grouped associated data in the database, a second group including alphanumeric information provided in the form of a range representing the second set of alphanumeric strings and including marking time data in the form of a range of time representing the second period of time. In this way, an alphanumeric string and marking time data can be read from a manufactured item and these two pieces of information can be used to interrogate the database. If they fall within the corresponding ranges for any one group, then the item can be confirmed as authentic. The database storage requirements can be much reduced by making use of ranges and groupings in this way.

In the above embodiments, the items marked with the first set of alphanumeric strings may be a first batch of items and the items marked with the second set of alphanumeric string may be a second batch of items.

In an embodiment, the method comprises transmitting and storing further production related information for the manufactured and marked item in association with the alphanumeric information and the marking time information. The further production related information may comprise a production line indicator and/or a manufacturing center indicator. The further production related information may also or alternatively include an intended market of sale for the manufactured item. If the item being tested is found to be offered for sale or sold in the wrong market, this would indicate parallel importation. This further information can be useful for tracking and tracing purposes. Accurate tracking and tracing of manufactured items is an important aspect in the battle against counterfeiters and parallel importers.

The alphanumeric string may utilize upper case letters, lower case letters and numbers, so that there are 62 possible different characters for each digit.

The alphanumeric string may be 4 to 8 digits long in a preferred embodiment. In this embodiment, the alphanumeric string has a relatively short string length, which is advantageous where the string is being sent by a user typing it into a keypad (e.g. on a mobile telephone). A shorter string makes the entry process easier to manage and more likely to be error free. The shorter string length may make it easier for a counterfeiter to guess a correct alphanumeric string, but the added layer of anti-counterfeiting provided by the marking time data means that matching guesses for these two markings would be needed, which is highly improbable. Thus, the combination of data marked on the item facilitates reducing the alphanumeric string length, thereby facilitating implementations having a low technology requirement, whereby the alphanumeric string is entered by keypad or by voice call to an operative entering the string by keypad.

It is also envisaged, however, that more sophisticated data entry means could be utilized at a user end. In particular, the alphanumeric string could be entered by an image capture device (e.g. a camera on a mobile telephone). Image based data entry means could also be used for capturing the marking time data marked on the item. The image would then be sent to a data management centre or to an application associated with the image capture device (e.g. the application could be stored on the mobile telephone), whereat an optical character recognition process would be run to determine the alphanumeric string characters (and possibly also the marking time characters) from the image(s). In this embodiment, the alphanumeric string could be longer than the 4 to 8 digits given above. For example, the alphanumeric string could be 6 to 16 digits in length.

The alphanumeric string may be generated using a random string generator. Alternatively, the alphanumeric string may be based at least partly on generating encoded data using an encoding algorithm. For example, a static encoding algorithm could be used, such as a simple substitution algorithm performed on certain production related data specific to each manufactured item to be marked or at least specific to a set of such items. Alternatively, a dynamic encoding algorithm could be used that changes with time. For example, the dynamic algorithm could be applied to certain production related data, whereby the algorithm and the production related data change with time. In another alternative, a hash algorithm could be used, such as a hash algorithm applied to production related data for manufactured items, to produce the alphanumeric strings for manufactured items.

In an embodiment, the method may comprise a step of generating the alphanumeric string, wherein the generating step includes encoding production related data corresponding to the manufactured item using an encoding algorithm (e.g. static, dynamic or hash encoding algorithm as described above). The production related data may comprise a production line indicator and/or a manufacturing center indicator. The production related data may also or alternatively include an intended market of sale for the manufactured item. The production related data may also or alternatively comprise a production date of the manufactured item. The production related data may comprise the marking time data. The method may further comprise storing production information in the database corresponding to the production related data in association with the alphanumeric information and the marking time information. In this way, the production data can be decoded from an alphanumeric string read from a manufactured item and compared to the corresponding data stored in the database. If they match, the item can be confirmed as authentic. This provides a further layer of security against counterfeiting.

The encoded production related data may be encoded marking time data, thereby allowing comparison with the corresponding information in the database and the marking time data marked on the manufactured item.

In an embodiment, the method further comprises storing in the database information identifying the anti-counterfeit indicium in association with the alphanumeric information. Thus, each row of related attributes in the database will comprise alphanumeric information, marking time information and indicium identifying information matching an alphanumeric string, marking time data and a visible indicium provided on at least one manufactured item. In this way, the database can be interrogated using an alphanumeric string read from a manufactured item to check that the visible indicium applied on the manufactured item matches that stored in the database. The information identifying the anti-counterfeit indicium could be a link to an image of the indicium and/or a description of the indicium or it could be the image and/or description itself. The use of a link means that the image and description only has to be stored once and the field entry for the information indicating the indicium can be low in data storage requirement. Authentication could involve returning from the database an image of the visible indicium associated with the alphanumeric information and/or a description of it to allow the visible indicium used to be checked.

In a preferred embodiment, the method comprises marking a first plurality of manufactured items with a first visible indicium, respective ones of a first set of alphanumeric strings and marking time data and marking a second plurality of manufactured items with a second visible indicium different from the first visible indicium, respective ones of a second set of alphanumeric strings and marking time data, the method further comprising storing in the database associated alphanumeric information and marking time information corresponding to the markings on each of the first plurality of manufactured items in association with a visible indicium identifier corresponding to the first visible indicium and storing in the database associated alphanumeric information and marking time information corresponding to the markings on each of the second plurality of manufactured items in association with a visible indicium identifier corresponding to the second visible indicium. In this way, the database can be interrogated based on data read from the manufactured item to determine that the item is authentic if the visible indicium identified in the database matches the visible indicium to be found on the manufactured item. This aspect of the present method allows the indicium to be changed frequently to provide an anti-counterfeiting measure that is hard to predict and replicate. In particular, the visible indicium could be changed for each batch, perhaps in a rotation of or random selection from a predetermined number of visible indicia designs.

The visible indicium, the alphanumeric string and the marking time data are preferably applied in distinct areas of the manufactured item. In the case of the product having faces, at least two, and preferably all three, of the visible indicium, the alphanumeric string and the marking time data are applied on different faces. Two of the three of the visible indicium, the alphanumeric string and the marking time data may be applied in different areas of one face and the other of the three may be applied on a different face to the other two. This distribution of the various anti-counterfeiting measures makes it somewhat difficult for counterfeiters to ascertain which elements are required to be copied. That is, it requires copying distinct and divided elements from the manufactured item.

In an embodiment, the method may include marking the manufactured item with a material-based security element. A material based security element is an element including a material of which a characteristic property relating to its specific nature and proportion allows materially authenticating the marked item by merely detecting said characteristic property. This material's characteristic property constitutes a "material signature" of the marking.

In an embodiment, the material based-security element forms at least a part of the anti-counterfeiting indicium, the alphanumeric string or the marking time data or any combination thereof.

In an embodiment, the material-based security element is embodied in an ink used in printing at least part of the visible indicium, the alphanumeric string, the marking time data or any combination thereof.

The material based security element may be provided in the form of a luminescing material. The luminescence may be revealed under non-visible light, e.g. ultraviolet light or infrared light. Alternatively, the luminescence may be revealed upon application of visible light. The luminescent material may be an up converting luminescent material or a down converting luminescent material. The luminescent material is preferably a fluorescent material, particularly when combined with the decay half-life or other decay time material characteristic described below.

In a preferred embodiment, the alphanumeric string and/or the marking time data may be printed with an ink including a luminescent component.

In a preferred embodiment, the anti-counterfeiting indicium includes a luminescent component. For example, the component could be impregnated in or coated on an optically variable substrate forming part of a visible indicium having an attribute that shifts depending upon viewing angle. Alternatively, the ink used to print the anti-counterfeiting indicium includes the luminescent component.

In an embodiment, the method may further comprise storing in the database a material signature of the material based security element marked on the manufactured item in association with the alphanumeric information and the marking time information. The material signature may be one or more spectral emission or absorption characteristics of the material based security element. The material signature is preferably a decay half-life or other decay time associated with the material based security element. Additionally or alternatively, the emission or absorption spectral characteristic may be related to peak intensity or some other characteristic of the emission or absorption spectrum of the material. The alphanumeric string and the production time data do not require special equipment for them to be checked, beyond, at least in the preferred embodiment, some sort of communication means with the database in order for an authentication process to proceed. The present embodiment adds a further layer of security useful for a user having relevant detecting equipment so that the material signature can be determined and checked with the expected material signature to authenticate the item.

The method may comprise storing in the database, in association with the alphanumeric information and the marking time information, brand name information corresponding to at least one marked manufactured item. Thus, a row of related attributes in the database may comprise alphanumeric information, marking time information and brand name information matching with an alphanumeric string, a marking time date and a brand name provided on at least one manufactured item.

In a second aspect of the present invention, there is provided a method of authenticating a manufactured item, the method comprising:
  checking authenticity of a visible anti-counterfeiting indicium provided on the manufactured item;
  processing an alphanumeric string read from the manufactured item to obtain marking time information for the manufactured item;
  comparing the marking time information with marking time data read from the manufactured item to determine if they match;
  determining the manufactured item as authentic if criteria are met, the criteria including that the checking step reveals an authentic anti-counterfeiting indicium and the comparing step determines a match.

According to the authentication method of the second aspect of the present invention, separate bits of data are read from the manufactured item and the alphanumeric string is used to derive marking time information so that a comparison with the marked marking time data can be made. The parts of data that need to be matched are not readily identifiable from the data marked on the manufactured item because of the requirement to first process the alphanumeric string. A covert anti-counterfeiting measure is thus provided. The anti-counterfeiting measures implemented involve a visible indicium and data no more complicated than an alphanumeric string. Accordingly, the data can be easily read without requiring an end user to have access to special technology (e.g. a mobile telephone that may or may not be required to have a camera depending upon length of alphanumeric string, as described above). This authentication procedure thus makes available to the general public an authentication process.

In an embodiment, the marking time data and the alphanumeric string may be sent to a data management centre over a telecommunication network (e.g. internet, intranet, landline, mobile, etc.).

The data management centre may perform the processing step. The data management centre may also perform the comparison step.

An application may be stored and run on a mobile telecommunications device (e.g. smartphone), which provides a framework for entering the alphanumeric string and the marking time data, and which controls transmitting this data to the data management centre. The application may also control displaying the result of the step of determining if the manufactured item is authentic. Alternatively, a web page may be accessed on a mobile telecommunications device (e.g. smartphone) or an internet connected computer (desktop or laptop) to enter the data read from the manufactured item and to communicate the data to the data management centre. Alternatively, the data read from the manufactured item can be sent to the data management centre by SMS. In each of these embodiments, the result of determining if the manufactured item is authentic may be displayed on a display of the device. In these embodiments, the data may be entered by keypad, touchscreen, mouse or image capture device (e.g. camera) or other known data entry devices. When an image capture device is used, an optical character recognition process is run either at the device or at the data management centre to obtain the alphanumeric string and/or the marking time data in computer processable form. Alternatively, the data read from the manufactured item can be communicated to the data management centre by a voice call.

The data management centre may return over a telecommunications network an authentic output if the criteria are met and may return a counterfeited output if the criteria are not met.

The use of a data management centre means that end users do not have access to the algorithm required to convert the alphanumeric string into marking time data, to ensure security in the anti-counterfeiting measures.

In an embodiment, the processing step includes using the alphanumeric string to retrieve from a database the marking time information associated with the alphanumeric string.

In an embodiment, a user device generates a query comprising a representation of the alphanumeric string. The user device is associated with transmission means to transmit the query to a database controller. The database controller interrogates the database using the alphanumeric string obtained from the query to obtain the marking time information stored in the database. The query may further comprise marking time data read from the manufactured item. The database controller may be configured to interrogate the database to determine if the alphanumeric string and the marking time data obtained from the query have matching associated alphanumeric information and marking time information in the database. If so, the database controller returns to the user device an indication that the marked item is authentic. If not, the database controller returns to the user device an indication that the marked item is not authentic. In an embodiment, the user device may be a mobile phone or other handheld computer device, a laptop computer, a desktop computer, etc. The query may be sent over an internet page, through a dedicated app, by SMS and in any other known such manner. The database controller and database may be part a remote data management centre so that the query has return has to be sent over a telecommunications network.

Additionally or alternatively, the processing step includes decoding the alphanumeric string to obtain the marking time information using a decoding algorithm. The decoding step may involve using a key to decrypt a hash code produced by a hash algorithm as described above, or reversing the static or dynamic coding algorithms described above.

In a preferred embodiment, first and second marking time information is obtained from the alphanumeric string, the first marking time information obtained by using the alphanumeric string to retrieve marking time information associated with the alphanumeric string from a database and the second marking time information obtained by decoding the alphanumeric string, wherein the criteria includes the marking time data read from the manufactured item matching the first and the second marking time information.

The method may further comprise a second comparison step comprising comparing a brand name read from the manufactured item to brand name information obtained by retrieving it from a database using the alphanumeric string, wherein the brand name information is associated with alphanumeric information representing the alphanumeric string in the database, and/or obtained by decoding the alphanumeric string. The criteria include matching the brand name and brand name information. This provides a yet further layer of authentication. The brand name read from the manufactured item may be sent over a telecommunications network to a data management centre at which the brand name information is obtained. The second comparison step may be performed at the data management centre.

The method may comprise determining a material signature from a material based security element on the manufactured item and comparing the material signature to material signature information, wherein the criteria comprise matching the read material signature with the material signature information.

In an embodiment, the material signature is obtained by illuminating the material based security element and detecting one or more emission or absorption characteristics of the material based signature as a result of the illumination, wherein the material signature is derived from the one or more emission characteristics. For example, the material based security element includes a luminescing, preferably fluorescing or phosphorescing, component and one or more characteristics of the emission or absorption spectrum of the luminescence is detected to derive the material signature. In a preferred embodiment, a decay half-life or other decay time of the luminescence is determined for the material based security element as the material signature.

The method may comprise obtaining the material signature information by processing the alphanumeric string. In particular, the material signature information may be retrieved from a database using the alphanumeric string. Retrieving the material signature may involve sending the alphanumeric string over a telecommunications network to a data management centre and sending the retrieved information over a telecommunications network. The processing of the alphanumeric string may alternatively involve decoding the alphanumeric string to obtain the material signature information.

The material signature may comprise emission, absorption or reflectance characteristics.

The material signature may be associated with luminescence, particularly florescence or phosphorescence, of the material based security element.

In an embodiment, the method may comprise determining a decay half-life or other decay time associated with a material based security element as a material characteristic and the criteria includes checking that the decay half-life or other decay time matches predetermined decay half-life or other decay time information. The decay half-life or other decay time may be the decay half-life or other decay time of a luminescent, particularly fluorescent or phosphorescent, material based security element. The determination of such a florescence or luminescence half-life or other decay time is known from other fields of technology. More broadly, the decay half-life or other decay time may be an electromagnetic emissions half-life or other decay time. Setting a material based security element to have a certain decay half-life or other half life is very difficult for counterfeiters to replicate and thus offers an extremely strong anti-counterfeiting measure.

The material based security element may form part of the alphanumeric string, the marking time data or the visible indicium or any combination thereof. In particular, the material based security element may be incorporated in ink used to print the alphanumeric string, the marking time data or at least part of the visible indicium or any combination thereof.

In an embodiment, the checking step comprises retrieving from a database a visible indicium indicator, wherein the visible indicium indicator is associated in the database with the alphanumeric information representing the alphanumeric string marked on the manufactured item, and checking that the visible indicium read from the manufactured item matches the visible indicium indicator.

The checking step may comprise sending a copy of the visible indicium read from the manufactured item (e.g. a photograph of the visible indicium) so that a data management centre processor compares the sent copy with the visible indicium indicator retrieved from the database. Alternatively, the visible indicium indicator retrieved from the database is such that a data management centre returns a description and/or an image of the visible indicium over a telecommunications network with which a user compares the description and/or image with the visible indicium on the manufactured item.

In a third aspect of the present invention, a system for implementing the method of the first aspect of the present invention is provided.

There is thus provided, a system for marking manufactured items, comprising:
at least one applicator for providing manufactured items with respective visible anti-counterfeiting indicium,
at least one marker configured to:
mark the manufactured items with respective visible alphanumeric strings, and
mark the manufactured items with respective visible marking time data;
data transmission and control means configured to transmit data representative of the alphanumeric strings and marking time data marked on the manufactured items;
a database and controller, configured to:
receive the transmitted data from the data transmission and control means;
store in association in the database marking time information corresponding to the received marking time data and alphanumeric information corresponding to the received alphanumeric strings, and
allow the database to be interrogated to check that the alphanumeric string and the marking time data marked on a manufactured item matches with the corresponding information stored in the database to thereby authenticate the manufactured item.

The marker may be located in a manufacturing or packaging facility, and the database may be externally located at a third party site.

The marker may comprise one or more printers, such as laser or inkjet printers for printing the alphanumeric code and the marking time data.

The visible indicium may be a separate element. Accordingly, the applicator may comprise an applier for applying the separate visible indicium to the manufactured item, such as by adhering. Alternatively, the visible indicium may be formed at least in part by printing on the manufactured item. The printer may be a different printer from the at least one printer forming the at least one marker. For example, the at least one marker may print in grayscale or black monochrome, whereas the printer for the visible indicium may produce color (not black or white) graphics, perhaps multicolor graphics. As well as the printer, the applicator may comprise a substrate application part for applying an anti-counterfeit substrate to the printed graphic, such as an optically variable substrate so that at least one attribute of the graphic changes with viewing angle. Alternatively, the ink itself may have an attribute (e.g. colour) shift depending upon viewing angle, such as with optical magnetically variable pigments as described above. In this case, an optical shift substrate is not required.

The database and controller are preferably configured so that the marking time information and/or the alphanumeric information are stored in the form of ranges. Thus, the database architecture is controlled so that a row of associated information includes a range of alphanumeric strings corresponding to a range of alphanumeric strings marked on a batch of manufactured items, and a range of marking time corresponding to a range of marking time data marked on the batch of manufactured items. Alternatively, the database architecture is controlled so that the same range of time corresponding to the range of marking time data marked on a batch of manufactured items is provided in association with a plurality of different alphanumeric strings corresponding to the alphanumeric strings marked on the batch of manufactured items.

The database and controller may be configured to store further production information for the manufactured and marked items in association with the alphanumeric information and the marking time information. The further production information may comprise a production line indicator and/or a manufacturing center indicator. The further production information may also or alternatively include an intended market of sale for the manufactured item. The marker may be associated with a controller configured to send the further production information to the database and controller over a telecommunications network.

In an embodiment, the system comprises a data reader for reading the alphanumeric string and the marking time data marked on the manufactured items and a transmission means for transmitting the read data to the database and controller for storing in the database. In this embodiment, the data reader is in communication with the data transmission and control means. The data transmission and control means may be integrated with a given data reader, or the data transmission and control means may be in communication with a plurality of such readers, perhaps each reader being associated with a respective process line of manufactured items. In this way, an additional security layer is incorporated into the present system because it is not the data intended to be marked on the manufactured items by the marker that is transmitted and stored, but the data read from actual markings on manufactured items.

In an alternative embodiment, the data transmission and control means may be in communication with the marking means. In this embodiment, the marking means is configured to send a signal representative of the alphanumeric string and marking time data marked on a manufactured item and the database transmission and control means is configured to send this data to the database and controller. In this embodiment, the transmitted data is ascertained from the marking means rather than being directly read using a data reader as described above.

The system may comprise an encoder configured to generate the alphanumeric string by encoding production related data corresponding to the manufactured item. The system may further comprise a decoder configure to decode the alphanumeric string to ascertain the production related data. The database and controller are configured to store the production information in the database corresponding to the production related data in association with the alphanumeric information and the marking time information. The encoded production related data may be encoded marking time data.

In an embodiment, the system comprises a part configured to apply a material based security element on the manufactured items. The material based security element may be applied as part of the alphanumeric string, as part of the marking time data, or as part of the visible indicium or any combinations thereof. The system may comprise a printer having luminescent, particularly florescent or phosphorescent, ink and the material based security element may be printed on the manufactured item using the luminescent, particularly florescent or phosphorescent, ink.

In an embodiment, the database and controller are configured to store in the database in association with the alphanumeric information, a material characteristic, such as luminescence half-life or other decay time or spectra information, of the material based security element applied on the manufactured items, the database and controller configured to allow the database to be interrogated with respect to an alphanumeric string read from a manufactured item to determine the material characteristic of the material based security element marked on the manufactured item.

In a fourth aspect of the present invention, there is provided a system generally corresponding to the method of the second aspect of the present invention.

Accordingly, there is provided a system for authenticating a manufactured item, the system comprising:
  a data entry device for entering an alphanumeric string marked on the manufactured item and for entering marking time data marked on the manufactured item;
  a processor configured to:
  process the entered alphanumeric string to obtain marking time information for the manufactured item;
  compare the marking time information with the entered marking time data to determine if they match;
  determine the manufactured item as authentic if criteria are met, the criteria including that the comparing step determines a match.

In an embodiment, the data entry device is provided at a user end and the processor is provided at a data management centre.

In an embodiment, the data entry device is provided as part of a device having telecommunications capability and is configured to transmit the entered alphanumeric string and the entered marking time data to the processor over a telecommunications network. The data entry device may be associated with a mobile telephone. The data entry device may comprise a keypad or touchscreen for entering the alphanumeric string and the marking time data and/or may comprise a scanner or image capture device for reading the alphanumeric string and the marking time data from the manufactured item.

The processor may be configured to return over a telecommunications network an authentic output if the criteria are met and to return a counterfeited output if the criteria are not met. The system may comprise a display for displaying the authentic or counterfeited output. The display and the data entry device may form parts of a handheld telecommunications device (including a smartphone and a tablet device) or parts of a laptop or desktop computer.

In an embodiment, the processor is in communication with a database and the processor is configured to use the alphanumeric string to retrieve from the database the marking time information associated with the alphanumeric string.

In an embodiment, the data entry device is associated with a device controller configured to generate a query indicating the alphanumeric string the marking time data. The data entry device is further associated with data transmission means configured to transmit the query to the processor, the processor comprising a database controller. The database controller is configured to interrogate a database using the alphanumeric string and the marking time data obtained from the query to determine if matching associated alphanumeric information and marking time information is stored in the database. If so, the processor is configured to return an indication that the manufactured item is authentic. If not, the processor is configured to return an indication that the manufactured item is not authentic.

Additionally or alternatively, the processor is in communication with a decoder, wherein the decoder is configured to decode the alphanumeric string to obtain the marking time information.

In a preferred embodiment, the processor is in communication with a database and is configured so that first marking time information is obtained by using the alphanumeric string to retrieve marking time information associated with the alphanumeric string from the database and the processor is in communication with a decoder configured so that second marking time information is obtained by decoding the alphanumeric string, wherein the criteria includes the input marking time data matching the first and the second marking time information.

The system may comprise a database in communication with the processor, the database having stored in association marking time information and alphanumeric information representing alphanumeric string and marking time data combinations marked on genuine manufactured items. The database may further store, in association with the marking time information and the alphanumeric information, brand name information, the combination of information representing corresponding marking time data, alphanumeric string and brand name combinations marked on genuine products.

The data entry device may be further for entering a brand name marked on the manufactured item, wherein the processor is configured to compare the entered brand name to the brand name information obtained by retrieving it from the database using the alphanumeric string and/or obtained by decoding the alphanumeric string. The criteria include matching brand name and brand name information. The data entry device may be associated with a telecommunications device so so that the input brand name is sent over a telecommunications network to the processor.

The data entry device may comprise a detector configured to determine a material signature from a material based security element on the manufactured item. The processor may be configured to compare the material signature to material signature information in a database, wherein the database associates the alphanumeric information representing an alphanumeric string marked on a genuine product with the material signature. The criteria comprise matching the detected material signature with the material signature information.

The material signature may comprise emission, absorption or reflectance characteristics.

The material signature may be associated with luminescence, particularly florescence or phosphorescence, of the material based security element.

In an embodiment, the detector is configured to determine an emission, e.g. luminescence, decay half-life or other decay time associated with the material based security element as the material signature. The criteria may include checking that the decay half-life or other decay time matches predetermined decay half-life or other decay time information. The decay half-life or other decay time may be the decay half-life or other decay time of a luminescent, particularly florescent or phosphorescent, material based security element. The determination of such a luminescence half-life or other decay time is known from other fields of technology.

The detector may be configured to illuminate the material based security element with visible or non-visible, e.g. ultraviolet or infrared, light. The material based security element includes luminescent material that will luminesce as a result of being illuminated and the detector is configured to determine a luminescence half-life or other decay time from a decay in the luminescence, to thereby obtain the material signature. Other spectral emissions or absorption characteristics may be determined to obtain the material signature.

More broadly, the decay half-life or other decay time may be an electromagnetic emissions half-life or other decay time.

In an embodiment, the processor is in communication with a database and is configured to retrieve from the database a visible anti-counterfeit indicium indicator, wherein the visible indicium indicator is associated in the database with the alphanumeric information representing the alphanumeric string marked on the manufactured item. The visible indicium indicator and the alphanumeric information match with a combination of a visible anti-counterfeit indicium and an alphanumeric string provided on at least one genuine manufactured item.

The data entry device may be configured to scan an anti-counterfeit visible indicium marked on the manufactured item and the processor may be configured to compare the entered visible indicium with the visible indicium indicator retrieved from the database and to determine if they match. The criteria include a requirement for the visible indicium indicator and the input visible indicium to match. The entered visible indicium and the visible indicium indicator may be compared using computer implemented image analysis techniques. Alternatively, the system comprises a user display and the processor is configured to send over a telecommunications network the visible indicium indicator for output on the display as an image and/or a description so that the user can determine if the visible indicium indicator retrieved from the database matches that provided on the manufactured item.

DETAILED DESCRIPTION OF PREFERRED EMBODIMENTS OF THE INVENTION

Figure 1:
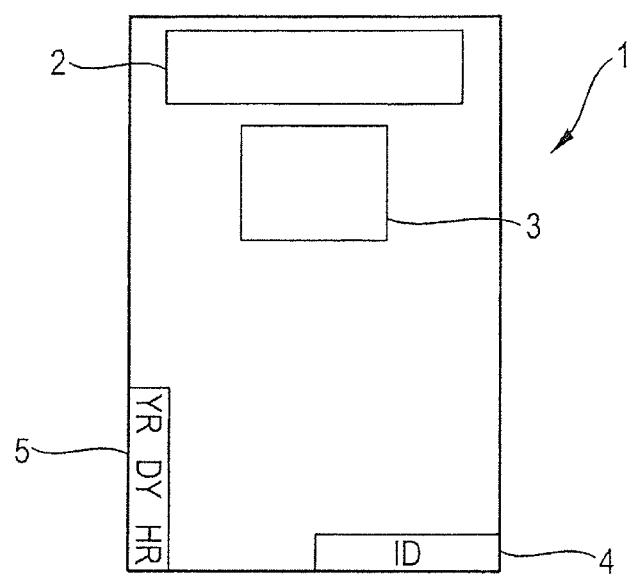
FIG. 1 shows an exemplary manufactured item having a combination of an anti-counterfeiting indicium, marking time data and an alphanumeric string provided thereon. The manufactured item also includes a brand name identifier.

FIG. 1 shows a manufactured item 1 marked according to an embodiment of the invention and authenticateable according to an embodiment of the present invention. The manufactured item 1 shown is a schematic view of a package of individual tobacco products. The manufactured items may, however, be other items subject to counterfeiting such as excisable manufactured items. Other manufactured items could be embodied in perfume packages, jewelry, e.g. watches, packages for alcoholic beverages, and packages for medicinal products. It is not just manufactured items subject to excised duties that the present invention can be applied to. Counterfeiting may also occur in clothing, sports equipment, electronic goods, etc. in which customer goodwill can be eroded by counterfeited goods reaching the market. Accordingly, the anti-counterfeiting markings of the present invention can be applied on a number of manufactured items or labels therefor, as would be appreciated by the skilled reader.

Referring back to FIG. 1, the manufactured item 1 includes a first area 2 in which an anti-counterfeiting visible indicium is applied. In a preferred embodiment, the anti-counterfeiting visible indicium is an optically variable element that has an attribute that shifts depending upon the viewing angle. In one implementation, the visible indicium area 2 reveals a graphic that changes colour depending upon the viewing angle. This can be produced by printing the graphic on the package of the manufactured item 1 and applying over the graphic a substrate for producing the colour shifting effect, depending upon a viewing angle. Alternatively, the printed material could itself include an optically variable pigment or an optical magnetically variable pigment that produce an image or other optical effect that looks different depending upon the viewing angle (e.g. different colour, position, shape, etc.). A user is required to change an angle of view relative to a normal angle extending from the surface of the visible indicium area 2 by at least 10° in order to reveal the shifting attribute. In particular, the visible indicium area 2 may be required to shift by at least 30°, 45°, 60°, or 75° in order to view the differing attributes, e.g. so that different colours in the graphic are seen.

The manufactured item 1 also includes a brand name area 3 in which a brand name is marked on the manufactured item 1. The brand name may be printed on the manufactured item 1. The brand name will generally be represented by human readable text.

The manufactured item 1 further includes an alphanumeric string area 4 in which an alphanumeric string is marked on the manufactured item 1. The alphanumeric string may constitute a combination of lower case letters, upper case letters and numbers that are visible to a human reader. The alphanumeric string will, however, merely seem as a random string of alphanumeric characters to the human reader, carrying no meaning.

The alphanumeric string may be of varying string length depending upon an authentication system and method. If the authentication method is to be compatible with users having relatively low end technology data entry devices, such as just a keypad, then the alphanumeric string should be kept relatively short in length. If such compatibility requirements are not paramount, then the alphanumeric string can be relatively long, assuming that the end user will be able to enter the alphanumeric string by capturing an image of it, or otherwise scanning the alphanumeric string. It is preferred that the alphanumeric string is kept relatively short in length, so that an end user can enter it by keypad with a low likelihood of error and without requiring too much time for entering the alphanumeric string. Accordingly, in a preferred embodiment, the alphanumeric string in the alphanumeric string area 4 is four to eight characters in length, preferably five or six characters in length. This relatively short alphanumeric string length can still be effective as an anti-counterfeiting measure because of the dual requirements in the authentication method of the present invention for marking time data and the alphanumeric string data to match corresponding data contained in a database, as will be discussed in greater detail below.

The marking time area 5 includes a string of characters representing a time at which the manufactured item 1 was marked therewith. In the shown embodiment, the marking time data is shown in the form of year, day and hour. Other time representing schemes could be used, such as merely day, merely year and day, merely hour, or more time specific information including possibly minute data in addition to the preceding data. Generally, the marking time will be represented by a string of numbers. The marking time data provided in the marking time area 5 may be readable and understandable by a human reader as representing a particular date and possibly also time of day.

Although not shown by a reference sign in FIG. 1, the manufactured item 1 includes, in a preferred embodiment, a material based security element having a material signature. The material based security element may be provided in an area of the manufactured item 1 other than the designated areas 2, 3, 4, 5 shown, but is preferably incorporated as part of at least one of the designated areas 2, 3, 4, 5 shown. The material based security element may be incorporated in an ink used to mark the alphanumeric string of the alphanumeric string area or to mark the marking time data of the marking time area 5 or both of these possibilities. Alternatively or additionally, the graphic provided in the visible indicium area 2 may be printed, at least in part, using such an ink. Alternatively or additionally, the substrate for applying the optically variable effect described above in the visible indicium area 2 may have a material based security element having a material signature impregnated therein, coated thereon or otherwise incorporated therein.

The material signature is not something that is determinable by a human viewing the material based security element. The material signature is derived by use of a sensor for detecting a characteristic, e.g. emission, absorption or reflectance, of the material based security element and processing the sensed characteristic to determine the material signature. In a preferred embodiment, the material based security element is a luminescent material printed on, or otherwise incorporated on, the manufactured item 1 and a characteristic of the luminescence is determinable by a suitable detecting device in order to derive the material signature. In particular, decay characteristics of the luminescent material are determined by the detection device as the material signature, in particular the decay half-life or other decay time. Other spectral characteristics of the luminescent material could, however, be determined for use as the material signature.

The areas for the alphanumeric string 4, the marking time data 5 and the visible indicium 2 and perhaps also the area for the brand name 3 are distinct in terms of location. They may even be distributed over more than one face of the manufactured item 1.

Figure 2:
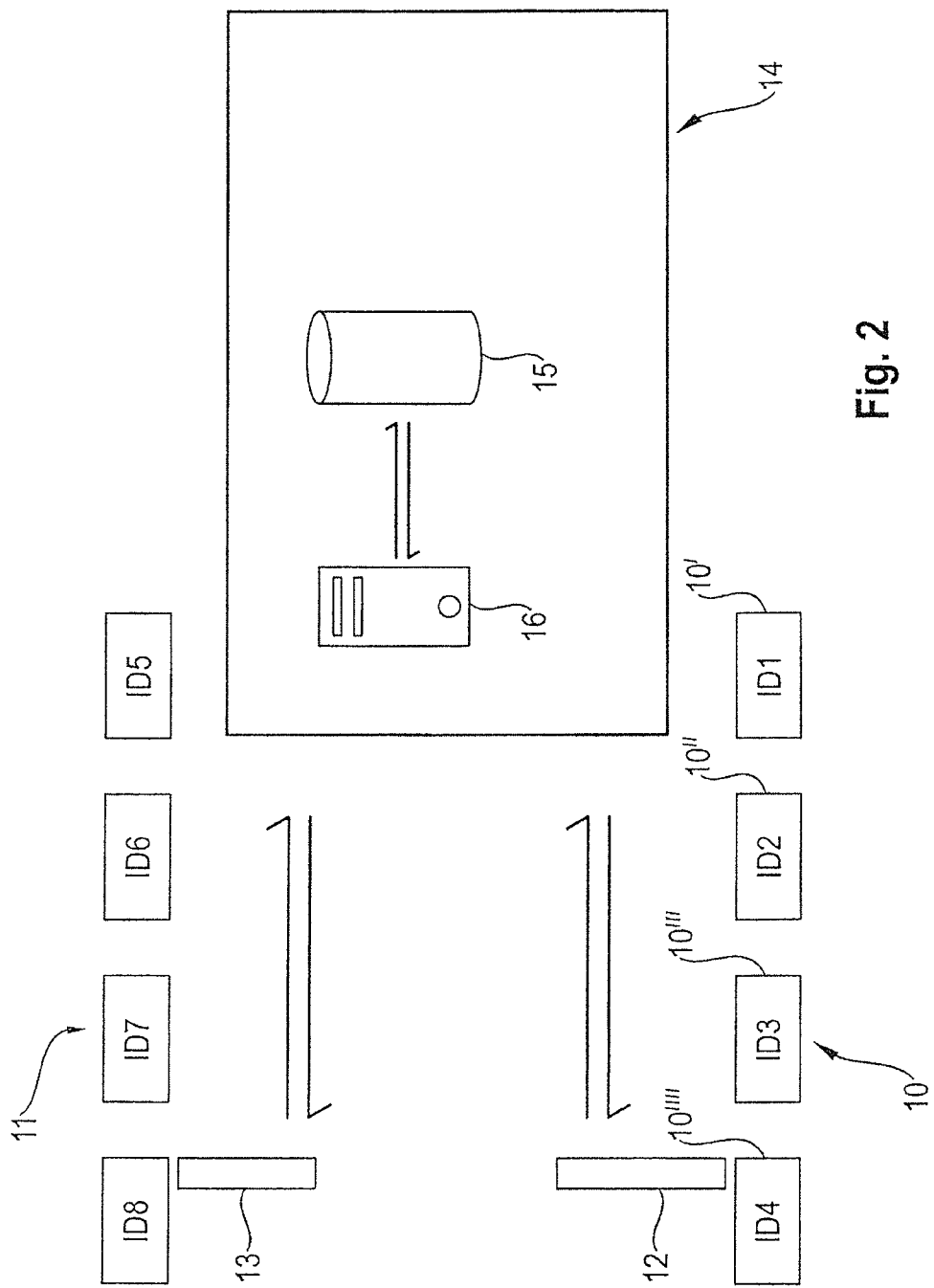
FIG. 2 shows a process for marking manufactured items comprising first and second lines of manufactured items and respective marking devices for marking the manufactured items with an alphanumeric string and marking time data. The marking devices are in communication with a database and a processor for storing records of matching marking time information and alphanumeric information corresponding to the marking time data and alphanumeric strings marked on the manufactured items. The database and processor may also be configured to store in each record brand name information, a visible indicium identifier and material signature information providing information representing a combination of an alphanumeric string, marking time data, a visible indicium, a brand name identifier and a material based security element having a material signature as applied on one or more genuine manufactured items.

Referring now to FIG. 2, there is shown a method and system for marking manufactured items. In the shown embodiment, there are first and second lines of manufactured items 10, 11.

There may, however, be just one line of manufactured items 10, 11 or more than two lines of manufactured items 10, 11. The first line of manufactured items is shown to include consecutive manufactured items 10', 10'', 10''', 10''''. The second line of manufactured items is similarly constituted.

First and second marking devices 12, 13 are respectively associated with the first line of manufactured items 10 and the second line of manufactured items 11. The marking devices 12, 13 are shown conceptually and would, in practice, be made up of at least two separate devices for applying the various markings, visible indicia and material based security elements described above.

An embodiment of the marking method of the present invention will be described predominantly with respect to the first line of manufactured items 10, with it being understood that a corresponding method is applicable to the second line of manufactured items 11.

The at least one marking device 12 marks a first at least one manufactured item 10' with a combination of an alphanumeric string and marking time data in the respective alphanumeric string area 4 and marking time area 5 described above. The at least one marking device 12 may randomly generate the alphanumeric string or may generate the alphanumeric string by encoding production related data by way of a static encoding algorithm, a dynamic encoding algorithm or a hash encoding algorithm. For example, the production related data used for the encoding process could be related to the marking line, marking time, a brand identifier and other such production related information. In one embodiment, the alphanumeric string could be a simple count in base 62 so that each successive at least one manufactured item represented by the boxes marked 10', 10", 10'", 10"" is marked with the preceding alphanumeric string with an increment of one. The counting algorithm is done in base 62, because there are 62 different characters for each digit in the alphanumeric string (26 upper case, 26 lower case and 10 numbers).

The first at least one manufactured item 10', the second at least one manufactured item 10", the third at least one manufactured item 10'", and the fourth at least one manufactured item 10"" may be constituted by an individual manufactured item or by a set or batch of manufactured items that are respectively marked with different alphanumeric strings by the at least one marking device 12. While it is preferred that successive individual manufactured items are marked with different alphanumeric strings, using the same alphanumeric string on a limited succession of manufactured items may be advantageous in keeping the alphanumeric string length short, for reasons explained above.

The at least one marking device 12 includes a clock so that marking time data can be marked on the manufactured items 10 in the marking time area 5, where the marking time data reflects the time kept by the clock. The marking time data may be different for each manufactured item 10 so that the first manufactured item 10', the second manufactured item 10", the third manufactured item 10'" and the fourth manufactured item 10"" have progressing marking time data marked thereon, where each box 10'-10"" represents an individual manufactured item. Alternatively, the boxes 10', 10"" could represent a set or batch of manufactured items, where the first set or batch of manufactured items 10' is marked with the same marking time data and the second set or batch of manufactured items 10" are marked with marking time data progressed from the first set or batch of manufactured items 10' and so forth to the fourth set or batch of manufactured items 10"". For example, the marking time information may only be specific to the hour, meaning that all manufactured items marked within that hour have the same marking time data provided thereon, whereas the subsequent set of manufactured items in the next hour are marked with a different marking time data representing the next hour. The marking time data could be even less specific and thus only differentiate days, providing a whole day's worth of manufactured items having the same marking time data. For example, box 10' may represent day 1 of manufactured items, box 10" may represent day 2 of manufactured items, and so forth.

It may be that the at least one marking device 12 is configured to mark each succeeding manufactured item with a different combination of alphanumeric string and marking time data, even if a number of manufactured items share the same alphanumeric string or marking time data. For example, the at least one marking device 12 may be configured to mark successive manufactured items with incrementing alphanumeric strings for a given time period, where each of those manufactured items are marked with the same marking time data for that period of time, such as marking time data representing day 1. The at least one marking device 12 could run a loop of a predefined number of alphanumeric strings, wherein the predefined number is so great as to make it practically impossible to guess genuine matching pairs of alphanumeric string and marking time data. Nonetheless, the loop will at some stage in the future (years apart) repeat the alphanumeric strings for a number of manufactured items. However, the combination of marking time data and alphanumeric string markings differentiate the manufactured items. The use of a combination of identifying markings allows the alphanumeric string to be kept relatively short in string length, which is advantageous for reasons already given.

An exemplary marking scheme is shown in table 1 in which the alphanumeric string is made of first, second and third digits representing a marker identifier used for marking a given line of manufactured items and the following five digits represent an incrementing ID in base 62. The table shows succeeding individual manufactured items and the respective dates and alphanumeric string markings applied thereto.

TABLE 1

| Alphanumeric String | | Marking Time Data | |
|---|---|---|---|
| Marker ID | Manufactured Item ID | Year | Day |
| hU8 | 00000 | 12 | 340 |
| hU8 | 00MTY | 12 | 340 |
| hU8 | 00Ix6 | 12 | 341 |
| hU8 | 0QSn2 | 13 | 341 |
| hU8 | 8XHoe | 14 | 341 |

Referring to table 1, the marking device 12 of FIG. 2 is given the identifier hU8 and each individual manufactured item is successively marked with an incrementing marking ID throughout day 340 of year 12. In the next day, the manufactured items continue to be marked with an incremented item ID that is run in a loop, but there will not be overlap in item IDs for a number of years, even if it is assumed that more than one manufactured item is marked per second and the marking is run 24 hours a day and 7 days a week. As such, there is practically no chance for a counterfeiter to correctly guess a genuine data pair of marking time and alphanumeric string. The last two rows of data show how the alphanumeric string data has incrementally progressed by year 13 and by year 14.

The at least one marking device 12 may include a visible indicium applicator for applying the visible indicium to the manufactured items 10. The applicator may print a graphic and apply an optically variable substrate as described above. The manufactured items may be marked with the same visible indicium or they may be marked with a respective one of a set of visible indicia. In the latter case, the data in table 1 will be supplemented with a visible indicium identifier column identifying the particular visible indicium applied on the manufactured item marked with a given alphanumeric string at a given marking time.

The marking devices 12, 13 may also include a part for applying a material signature component to the manufactured items. For example, with respect to the first line of manufactured items 10, the at least one marking device 12 may include a material based security element applier that incorporates on the manufactured items 10 a material based security element having a material signature. For example, the applier may be a printer for printing with an ink having a luminescent component or a luminescent component depositor. As described above, the luminescent component may be incorporated in the alphanumeric string, the marking time data and/or the visible indicium.

The material signature of the material based security element may be the same for each manufactured item. If the at least one marker, however, applies different material based security elements having different material signatures to manufactured items, the table 1 will be supplemented with a further column having a material based security element identifier relating a given alphanumeric string and marking time data applied on a manufactured item with the matching material signature applied on the item.

The marking devices 12, 13 may be networked with the data management centre 14 so that the information marked on the manufactured items can be sent to the data management centre 14, which identifies the combination of alphanumeric strings and marking time data respectively marked on manufactured items. Alternatively, a data reader 34 is provided that reads the data marked on the manufactured items 10, 11 and is in communication with data management centre 14 as described below in FIG. 4. The database controller 16 receives the information (e.g. the data contained in table 1) sent by the marking devices 12, 13 or sent by use of a data reader 34 as described below with reference to FIG. 4 and constructs a database of records, where each record represents a combination of an alphanumeric string and marking time data marked on a genuine manufactured item or items. Each record may also include a visible indicium indicator identifying a visible indicium marked on the manufactured item or manufactured items. Each record thus includes alphanumeric string information, marking time information and a visible indicium indicator corresponding to an alphanumeric string, marking time data and a visible indicium combination marked on a genuine manufactured item or items. In addition to the visible indicium indicator or alternatively thereto, each record in the database may include a material signature identifier so that each record provides alphanumeric string information, marking time information, optionally a visible indicium indicator and a material signature indicator corresponding to the combination of an alphanumeric string, marking time data, a visible indicium and a material signature associated with a material base security element provided on a genuine manufactured item or items.

The visible indicium indicator and the material signature indicator in the database may be sent along with the alphanumeric string and marking time data sent from the marking devices 12, 13 or sent via the data reader 34 or it may be prior knowledge in that the controller 16 stores information associating a particular marker ID (see table 1) with applying a particular visible indicium and a particular material based security element having a particular material signature. This use of prior information reduces the amount of information that has to be sent by the marking devices 12, 13 and is useful when the visible indicium and the material based security element does not vary for a given marking device 12, 13.

The database 15 and controller 16 may be designed so that the alphanumeric string data and the marking time data provided by the markers 12, 13 are grouped into ranges for each record. For example, each record in the database may be provided for a respective marking day and the related alphanumeric string information could be provided as a range of alphanumeric strings marked in that day. Alternatively, the records could relate a range of alphanumeric strings marked on manufactured items for a range of days. Both of these measures serve to reduce database storage requirements.

Example records stored in the database are shown in table 2 below.

TABLE 2

| Alphanumeric String Range | Marking Time Range | Visible Indicium ID | Material Signature ID | Brand Name ID |
|---|---|---|---|---|
| hU800000-hU8001ZY | 12340-12347 | 01 | 01 | xX |
| . | | | | |
| . | | | | |
| 28JxA-2ArI0 | 13340-13347 | 01 | 01 | xX |

There are five related attributes for each record, namely an alphanumeric string range providing alphanumeric string information, a marking time range providing marking time information, a visible indicium ID, a material signature ID and a brand name ID. Each record represents a combination of markings and features applied on genuine manufactured items by the at least one marker 12. The database can be interrogated to check that data marked on a given manufactured item matches a record stored in the database for genuine products, as will be described below.

The brand name information can, like the visible indicium ID and material signature ID, be information pre-stored in memory associated with the database controller 16 as a particular marking device may be consistently used for providing markings on a particular brand item. Alternatively, the marking devices 12, 13 could be configured to transmit the brand name of the manufactured item in association with the alphanumeric string and marking time data marked on the manufactured item, if a marking device is used for a number of different brand name products.

Generally, the brand name portion of the manufactured item is pre-printed on the item and the marking devices 12, 13 serve to add the anti-counterfeiting features of the alphanumeric string, the visible indicium, the marking time data and any material based security element.

As briefly mentioned above, the marking devices 12, 13 could be set up so as to mark a set or batch of manufactured items with the same alphanumeric string. For example, in a marking line in which tens of thousands of manufactured items are being produced per day, hundreds or thousands of those manufactured items could be marked with the same alphanumeric string. Alternatively, all manufactured items for a given day could be marked with the same alphanumeric string. The alphanumeric string could be incremented every hundred, every thousand or every day. The marking time data could be marked in the same way as described above. The resulting database would thus include records in which marking time information, such as a particular day, could be associated with one or more alphanumeric strings representing hundreds, thousands or a whole day's worth of manufactured items. While these manufactured items would not be differentiable from one another in terms of the markings, the database would still include alphanumeric string information and marking time information that are matched for genuine manufactured items. The counterfeiter would thus still be required to guess a pair of alphanumeric string and marking time information from a great range of possibilities making such guesswork practically impossible. In this embodiment whereby sets or batches of manufactured items are marked with the same alphanumeric strings, the database requirements can be reduced and further the length of the alphanumeric string can be reduced without sacrificing, in any statistically relevant manner, an improbability of a counterfeiter guessing the relevant markings correctly.

Figure 4:
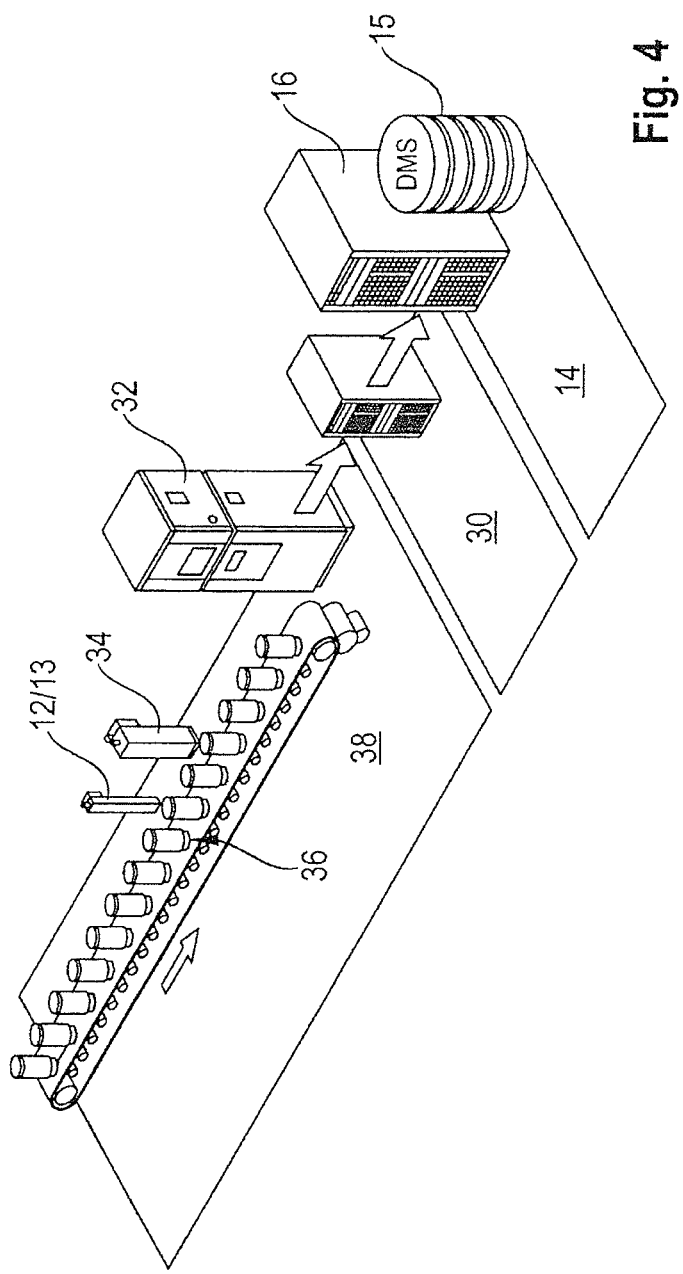
FIG. 4 shows an overview of the system by which data read from manufactured items on a given production line is transmitted to a remote data management centre via an on-site central controller.

In an embodiment, the markers 12, 13 do not transmit data marked on the manufactured items 10, 11 to the data management centre 14, nor is a transmission means associated therewith controlled to do so. Advantageously, and with reference to FIG. 4, a data reader 34 is provided to read the alphanumeric string and marking time data marked on the manufactured items 36 by the markers 12/13. As shown in FIG. 4, the data read from the manufactured items 36 is then sent to a production line controller 32 for transmitting the data to an on-site central data management controller 30. The controller 30 may be in communication with a number of production line controllers like the production line controller 32, so that it receives and assimilates data read from manufactured items on a number of production lines. The on-site central controller 32 is configured to transmit the assimilated data to the data management centre 14 for use in the manner described above to store the relevant data in the database 15 by way of using a controller 16 that forms part of the data management centre 14. The data management centre 14 will receive corresponding data from a number of on-site central controllers and will store the alphanumeric information and the marking time information corresponding to data read from manufactured items processed at all of these different and geographically spread processing sites. The database 15 may include information differentiating processing lines and/or processing sites for the manufactured items. In the embodiment shown in FIG. 4, the data reader 34 is downstream at least one marker 12/13 on the same process line of manufactured items. It could be, however, that the marker 12/13 and data reader 34 are provided on separate process lines.

Figure 3:
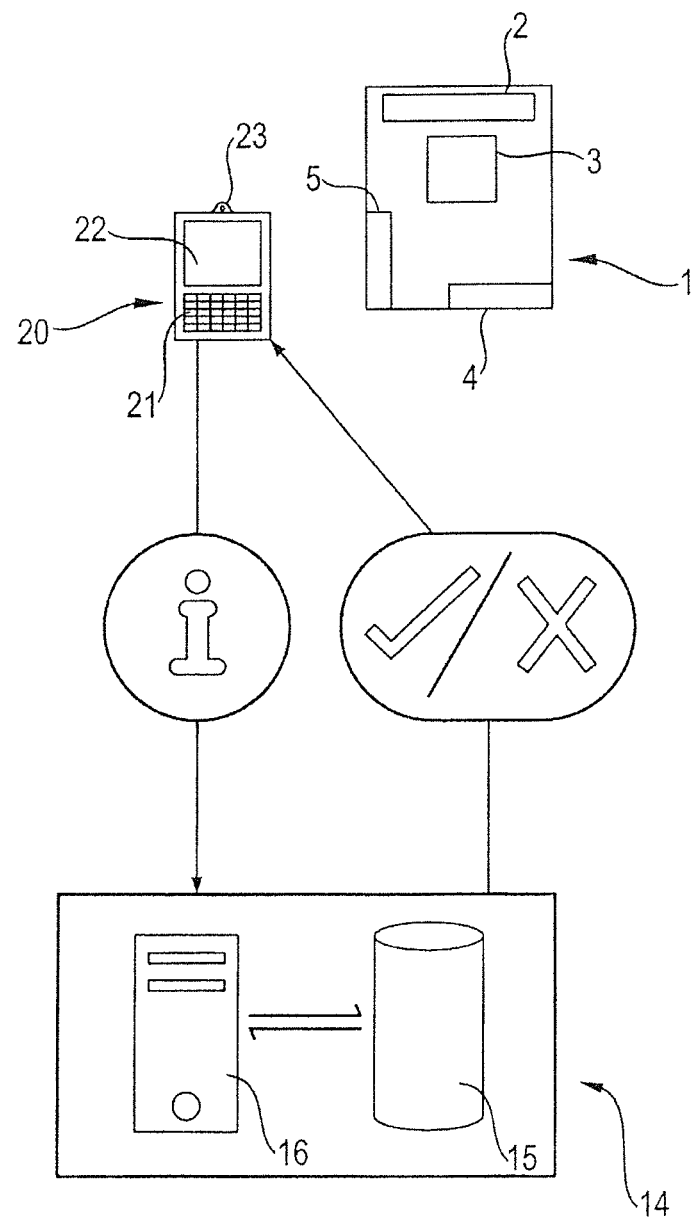
FIG. 3 shows a method and system for authenticating a manufactured item, in which a hand-held mobile telecommunications device takes data read from the manufactured items and provides the data to a database and a controller for determining whether that combination of data has been applied on at least one manufactured item by interrogating records in the database. The database and controller are configured to return a determination as to whether or not the manufactured item is authentic based on whether the data read from the manufactured item matches a combination of corresponding data stored in the database. The database and controller are kept at a data management centre and the communication with the hand-held mobile telecommunications device is done over a telecommunications network. The hand-held telecommunications device has a display for displaying the returned determination on the authenticity of the subject manufactured item.

FIG. 3 shows a method and system for authenticating a manufactured item 1 that has been made according to the method described above with respect to FIG. 2.

The system includes a manufactured item 1, a mobile telecommunications device 20 and the data management centre 14. The manufactured item 1 is provided with an alphanumeric string area 4 marked with an alphanumeric string, a marking time area 5 marked with marking time data, and optionally any combination of a visible indicium area 2 including an anti-counterfeit indicium therein, a brand name area 3 including a brand name identifier therein, and a material based security element having a material signature incorporated in the manufactured item 1. In the shown embodiment, the manufactured items 36 are beer or other alcoholic beverage cans, to illustrate that the present invention is not limited to application with tobacco product packages.

The hand-held mobile telecommunications device 20 includes a keypad 21 for entering data read from the manufactured item 1 and a display 22 for displaying an authentication process result. In an alternative embodiment, the telecommunications device 20 could be replaced by a smartphone, which may have a touchscreen keypad and which is internet-capable. The mobile telecommunications device 20 optionally includes a camera 23. The mobile telecommunications device 20 may alternatively be replaced by a laptop or desktop computer. Important is that there is some sort of data entry means for entering data read from the manufactured item 1 and a communications line to the remote data management centre 14. In another possibility, the telecommunications device 20 could be provided by a dedicated console for scanning or otherwise capturing data on the manufactured item 1.

The authentication method comprises an end user, such as an inspector, reading the alphanumeric string and the marking time data from the manufactured item 1 and entering this data into the mobile telecommunications device 20. This entering process may be performed by typing the characters into the keypad 21, thereby facilitating a low technology requirement solution. Alternatively, the camera 23 can be used to take an image of the alphanumeric string area 4 and the marking time data area 5. Other scanning or automatic reading means could be used as the data entry device.

The data read from the manufactured item 1 may be sent by SMS to the data management centre 14. Alternatively, the captured images could be sent by MMS to the data management centre 14. Other network means than SMS may be used, such as other mobile data transmission (e.g. over 3G, 4G or other network), wifi, etc. In an alternative embodiment, the mobile telecommunications device 20 has an application stored thereon for coordinating the data entry and data transmission. The application may prompt a user to capture an image of the alphanumeric string area 4 and the marking time area 5 using the camera 23 or the application may provide the user with data entry boxes for entering the alphanumeric string and the marking time data by way of the keypad 21. If the data is entered by way of an image, the application may include optical character recognition software so that the image is converted to character data before sending it to the data management centre. In an alternative embodiment, the images may be sent to the data management centre 14 at which the optical character recognition process is carried out. Instead of an application stored on the mobile telecommunications device 20, the mobile telecommunications device may open a web page running a corresponding application allowing the data to be entered and sent to the data management centre 14.

The data management centre 14 uses the alphanumeric string data and/or the marking time data sent by the mobile telecommunications device 20 in order to interrogate the database 15. The database may be configured so that alphanumeric string information provides a primary key to the records in the database, or the marking time information provides a primary key to the records in the database or the alphanumeric string information and the marking time information form a compound key for the records in the database 15.

The alphanumeric string sent from the mobile telecommunications device 20 may be used to sort at least one relevant record having alphanumeric string information that matches the alphanumeric string read from the manufactured item 1. As explained above, the alphanumeric string information could be provided as a range or group of alphanumeric strings, meaning that the matching requirement can be provided by the specific alphanumeric string falling within the range or group stored in the database 15. The marking time data read from the manufactured item 1 could then be compared to the marking time information of the at least one sorted record to determine if there is any match. If a match is found, then it means that the combination of alphanumeric string and marking time data provided on the manufactured item 1 matches with a combination of these data elements provided on a genuine manufactured item. As such, the controller 16 will determine that the manufactured item 1 is authentic. Alternatively, the alphanumeric string sent by the mobile telecommunications device 20 may not have counterpart alphanumeric string information in the database 15 or counterpart alphanumeric string information is found in at least one sorted record but the marking time data sent from the mobile telecommunications device 20 does not have a counterpart in the at least one sorted record. As such, no genuine articles were marked with the combination of alphanumeric string and marking time data read from the manufactured item 1, such that the data management centre 14 will determine the manufactured item 1 as not being authentic.

The data management centre 14 is configured to return an authentic (as represented by the tick in FIG. 3) or a not authentic (as represented by the cross in FIG. 3) signal. The mobile telecommunications device receives this signal and displays the determined authentic or not authentic result.

As explained above, the database 15 may include further information such as any one or combination of a visible indicium ID, a material signature ID and a brand name ID. The mobile telecommunications device 20 may be configured to read and transmit the brand name identifier in the brand name area 2 to the data management centre, which provides a further layer of anti-counterfeiting protection. More specifically, three data points read from the manufactured item 1 in combination must have a counterpart combination in the database 15 for an authentic determination to be made.

In one embodiment, the database 15 may also include a visible indicium ID with respect to each record. The data management centre 14 is configured to return not only the authentic or not authentic determination based on whether the combination of alphanumeric string and marking time data read from the manufactured item 1 match with a record in the database 15, but also return a description or graphical image of the visible indicium that is displayed on the display 22. The user can thus check that the visible indicium marked on the genuine product according to the database 15 matches with the visible indicium on the manufactured item 1. Alternatively, the camera 23 of the mobile telecommunications device 20 can be used to take a picture of the visible indicium in the visible indicium area 2 and the picture can be sent along with the alphanumeric string and marking time data read from the manufactured item 1 to the data management centre 14. A process of searching for a matching record in the database 15 for these three data elements is executed by the controller 16 and if a matching record is found, then the data management centre 14 returns an authentic signal and, if not, a not authentic signal is returned. The visible indicium ID in the database may be a reference to a graphic of the visible indicium. The processor 16 includes image analysis software to confirm that the sent graphic matches the corresponding graphic in the database.

In a simpler embodiment, the visible indicium 2 may not necessarily be included in the records of the database 15, and the check on the visible indicium is performed only by the end user. For example, end user is required to check if an attribute of the visible indicium changes in a predetermined manner known to the end user as the viewing angle changes.

A supplementary piece of equipment not shown in FIG. 3 may also be provided that includes a detector for detecting a material signature of a material based security element provided on the manufactured item 1. Alternatively, such a detector could be incorporated into the mobile telecommunications device 20. In an embodiment, the device may include a visible or non-visible light source that can be directed at the material based security element. The device also includes a sensor for sensing one or more characteristics of an omission or absorption spectra of the material based security element to determine the material signature. For example, the material based security element may have incorporated therein a luminescent material and the material signature determined may be a characteristic of the emission spectra of the luminescent material such as a decay characteristic, particularly a decay half-life.

The device for detecting the material signature may include a display for outputting the material signature. The data management centre 14 may be configured to return a material signature stored in a record in the database 15 found to match the alphanumeric string data and marking time data read from the manufactured item 1. The device or the user can then compare the material signatures to determine if they match in order to arrive at an authentic determination. Alternatively, the material signature determined from the manufactured item 1 can be sent to the data management centre 14 so that the controller 16 can search the database for any matching records having an alphanumeric string read from the manufactured item matching the alphanumeric string information contained in the database 15, marking time information in the database 15 matching marking time data read form the manufactured item 1 and also matching material signatures. If a record is found including this combination of matching elements, then a determination can be returned to the mobile telecommunications device 20 that the manufactured item 1 is authentic. If not, a not authentic return signal is sent.

In an alternative embodiment, the data management centre 14 may also include decoding software for decoding the alphanumeric string sent to the data management centre 14. As explained above, the alphanumeric string may, as an alternative to the incrementing count embodiment given in detail above, be provided as an encoded version of production related data. In particular, the alphanumeric string can be decoded from a seemingly random string of characters into at least one of or a combination of a brand name data and marking time data. The processor 16 can thus be configured to compare the marking time data read from the manufactured item 1 with the decoded brand name data and/or compare the brand name read from the manufactured item 1 with the decoded brand name data. In this way, the decoded data has to match with the data read from the manufactured item 1 and the data read from the manufacture item has to match with a record in the database 15 for an authentic determination to be returned by the data management centre 14.

The invention claimed is:

1. A method of marking and authenticating a manufactured item, comprising:
   providing the manufactured item with a visible anti-counterfeiting indicium;
   marking with marking means the manufactured item with a visible alphanumeric string;
   marking with marking means the manufactured item with visible marking time data that specify the date of manufacture of the item, wherein the visible anti-counterfeiting indicium, the visible alphanumeric string and the visible marking time data are applied in distinct areas of the manufactured item, and wherein the visible alphanumeric string encodes marking time data corresponding to the visible marking time data marked on the manufactured item, and wherein the visible marking time data marked on the manufactured item includes a string of characters readable and understandable by a human reader as representing a particular date;

transmitting with data transmission and control means an alphanumeric string representing the visible alphanumeric string marked on the manufactured item, and marking time data representing the visible marking time data marked on the manufactured item;

with computer database control means, receiving the transmitted marking time data and the transmitted alphanumeric string and storing in association in a database marking time information corresponding with the received marking time data and alphanumeric information corresponding with the received alphanumeric string;

checking authenticity of the anti-counterfeiting indicium provided on the manufactured item;

reading the visible marking time data marked on the manufactured item;

reading the alphanumeric string marked on the manufactured item;

processing with computer processing means the alphanumeric string read from the manufactured item to obtain first and second marking time information for the manufactured item, wherein the first marking time information is obtained by using the alphanumeric string to retrieve the marking time information associated with the alphanumeric string from the database with computer database control means, and the second marking time information is obtained by decoding with computer decoding means the marking time data encoded in the alphanumeric string, comparing, with the computer processing means, the first and second marking time information with the marking time data read from the manufactured item to determine if they match;

determining, with the computer processing means, the manufactured item as authentic if criteria are met, the criteria including that the checking step reveals an authentic anti-counterfeiting indicium and the comparing step determines a match, wherein the method comprises, with marking means, marking the manufactured item with a material-based security element having a material characteristic, wherein the material-based security element forms at least part of the visible marking time data, and the visible alphanumeric string encodes material signature information of the material-based security element marked on the manufactured item, and wherein the material-based security element is a fluorescent or phosphorescent security element, and the method further comprises determining a material signature from the material-based security element on the manufactured item with reading means comprising material signature sensing means; processing with the computer processing means the alphanumeric string read from the manufactured item to obtain the material signature information for the manufactured item by decoding with the computer decoding means the material signature information encoded in the alphanumeric string; and comparing with the computer processing means the obtained material signature information to the material signature determined with the reading means to determine if they match, wherein the criteria further include that the comparing step applied to the material signature determines a match.

2. The method of claim 1, wherein the marking time information and/or the alphanumeric information is stored in the form of a range, wherein the alphanumeric range information corresponds to a plurality of different alphanumeric strings marked on respective manufactured items and the marking time range information corresponds to different marking time data marked on respective manufactured items.

3. The method of claim 1, wherein the method comprises marking with marking means manufactured items with respective ones of a set of alphanumeric strings and marking time data over a period of time and with computer database control means storing grouped associated data in the database, the group including alphanumeric information provided in the form of a range representing the set of alphanumeric strings and including marking time data in the form of a range of time representing the period of time.

4. The method of claim 1, wherein the method comprises with computer database control means, storing in the database the associated alphanumeric information and the marking time information corresponding to the markings on the manufactured item in association with a visible indicium identifier corresponding to the visible indicium provided on the manufactured item.

5. The method of claim 1, wherein the material-based security element further forms at least part of the anti-counterfeit indicium and/or the visible alphanumeric string.

6. The method of claim 1, wherein the method further comprises with the computer database control means storing in the database the material signature information of the material-based security element marked on the manufactured item in association with the alphanumeric information and the marking time information.

7. The method of claim 1, wherein further item identifying information is stored in the database in association with the alphanumeric string information and the marking time information, wherein the further item identifying information identifies to a consumer the specific manufactured item from a group of related manufactured items and the manufactured item also has the further item identifying information marked thereon.

8. The method of claim 1, wherein the marking time data and the alphanumeric string are sent to a data management centre over a telecommunications network and the data management centre performs the processing step.

9. The method of claim 1, wherein a data management centre returns over a telecommunications network, an authentic output if the criteria are met and returns a counterfeited output if the criteria are not met, whereby the comparing and determining steps are performed by computer processing means.

10. The method of claim 1, wherein the processing step includes a database and controller receiving a query message including a representation of an alphanumeric string and the database and controller interrogating a database using the alphanumeric string obtained from the query message to retrieve from the database the marking time information associated with the alphanumeric string.

11. The method of claim 1, comprising a second comparison step comprising comparing a brand name read from the manufactured item to brand name information obtained by retrieving it from a database using the alphanumeric string, wherein the brand name information is associated with alphanumeric information representing the alphanumeric string in the database and is retrieved by computer database control means and/or obtained by decoding the alphanumeric string with computer decoding means, and wherein the criteria include matching brand name and brand name information.

12. The method of claim 1, comprising determining a decay half-life or other decay time associated with the material-based security element provided on the manufactured item or determining another emission or absorption spectral characteristic as the material signature with the reading means and the criteria includes checking that the decay half-life matches predetermined decay half-life information.

13. The method of claim 7, wherein the checking step comprises retrieving from a database a visible indicium indicator with a computer database control means, wherein the visible indicium indicator is associated in the database with the alphanumeric information representing the alphanumeric string marked on the manufactured item, and checking that the visible indicium read from the manufactured item matches the visible indicium indicator.

14. A system for marking and authenticating manufactured items, comprising:
at least one application machine configured to provide the manufactured items with respective visible anti-counterfeiting indicium;
at least one marking machine configured to:
mark the manufactured items with respective visible alphanumeric strings, and
mark the manufactured items with respective visible marking time data that specify the date of manufacture of the item, such that the visible anti-counterfeiting indicium, the visible alphanumeric string and the visible marking time data are applied in distinct areas of the manufactured item, and wherein the visible alphanumeric string encodes marking time data corresponding to the visible marking time data marked on the manufactured item, and wherein the visible marking time data marked on the manufactured item includes a string of characters readable and understandable by a human reader as representing a particular date;
transmission and control means for transmitting data representing the visible alphanumeric strings marked on the manufactured items and the visible marking time data marked on the manufactured items;
a database and computer database controller, configured to:
receive the transmitted data from the transmission and control means; and
store in association in the database marking time information corresponding to the visible marking time data marked on the manufactured items and alphanumeric information corresponding to the visible alphanumeric strings marked on the manufactured items,
a data entry device for entering the visible alphanumeric string marked on the manufactured item and for entering the visible marking time data marked on the manufactured item; and
a computer processor configured to:
process the input alphanumeric string to obtain first and second marking time information for the manufactured item such that the first marking time information is obtained by using the alphanumeric string to retrieve the marking time information associated with the alphanumeric string from the database with computer database control means, and the second marking time information is obtained by decoding with computer decoding means the marking time data encoded in the alphanumeric string;
compare the first and second marking time information with the input marking time data to determine if they match;
determine the manufactured item as authentic if criteria are met, the criteria including that the comparison determines a match,
wherein the at least one marking machine is configured to mark the manufactured items with a material-based security element having a material characteristic, wherein the material-based security element forms at least part of the marking time data, and the visible alphanumeric string encodes material signature information of the material-based security element marked on the manufactured item, and wherein the material-based security element is a fluorescent or phosphorescent security element,
wherein the data entry device comprises a detector configured to determine a material signature from the material-based security element on the manufactured item,
and the computer processor is further configured to: process the alphanumeric string read from the manufactured item to obtain the material signature information for the manufactured item by decoding with the computer decoding means the material signature information encoded in the alphanumeric string; and compare the obtained material signature information to the material signature determined with the detector to determine if they match, wherein the criteria further include that the comparison applied to the material signature determines a match.

15. The system of claim 14, the database and controller are configured so that the database architecture is controlled to provide rows of associated information, each row corresponding to a set of manufactured items, each row including a range of alphanumeric strings corresponding to a range of alphanumeric strings marked on the set of manufactured items, and a range of marking times corresponding to a range of marking time data marked on the set of manufactured items, or the database and controller are configured to provide a database architecture providing rows of related attributes, each row corresponding to at least one manufactured item, wherein each row includes alphanumeric string information corresponding to an alphanumeric string marked on the at least one manufactured item and a range of time information corresponding to the marking time data marked on the at least one manufactured item in that the marking time data forms a specific marking time falling within the more general range of time information.

16. The system of claim 14, wherein the database and controller are configured to store in the database in association with the alphanumeric information for each manufactured item, the material characteristic of the material-based security element marked on the manufactured items, the database and controller configured to allow the database to be interrogated with respect to an alphanumeric string read from a manufactured item to retrieve the material characteristic stored in the database.

17. The system of claim 14, wherein the data entry device has telecommunications capability and is configured to transmit the entered alphanumeric string and the entered marking time data to the processor over a telecommunications network.

18. The system of claim 14, wherein the processor is configured to return an authentic output if the criteria are met and return a counterfeited output if the criteria are not met.

19. The system of claim 14, wherein the data entry device is associated with a device controller for generating a query including a representation of the alphanumeric string, wherein a transmission means is configured to transmit the query and wherein the processor is in communication with a computer controlled database and the processor is configured to receive the query and use the alphanumeric string obtained from the query to retrieve from the database the marking time information associated with the alphanumeric string.

20. The system of claim 14, wherein the processor is in communication with a computer controlled decoder, wherein the decoder is configured to decode the alphanumeric string to obtain the marking time information.

21. The system of claim 14, wherein the detector is configured to determine an emission, decay half-life or other decay time associated with the material-based security element as the material characteristic.

22. The system of claim 14, wherein the processor is in communication with a computer controlled database and is configured to retrieve from the database a visible indicium indicator, wherein the visible indicium indicator is associated in the database with the alphanumeric information representing the alphanumeric string marked on the manufactured item, wherein either the data entry device is configured to scan an anti-counterfeit visible indicium marked on the manufactured item and the processor is configured to compare the scanned visible indicium with the visible indicium indicator retrieved from the database and to determine if they match, wherein the criteria include a requirement for the visible indicium indicator and the scanned visible indicium to match, or the system comprises a user display and the processor is configured to send over a telecommunications network the visible indicium indicator for output on the display as an image and/or a description so that the user can determine if the visible indicium indicator retrieved from the database matches that marked on the manufactured item.

* * * * *